United States Patent [19]

Ackermann

[11] Patent Number: 5,428,536
[45] Date of Patent: Jun. 27, 1995

[54] METHOD OF STEERING A ROAD VEHICLE WITH FRONT-WHEEL STEERING

[75] Inventor: Jürgen Ackermann, Herrsching, Germany

[73] Assignee: Deutsche Forschungsanstalt fur Luft- und Raumfahrt E.V., Köln, Germany

[21] Appl. No.: 205,543

[22] Filed: Mar. 4, 1994

[30] Foreign Application Priority Data

Mar. 9, 1993 [DE] Germany ............... 43 07 420.0

[51] Int. Cl.⁶ .................................. B62D 6/04
[52] U.S. Cl. ................... 364/424.05; 364/426.02; 280/91; 180/140; 180/791
[58] Field of Search ............ 364/424.05, 424.01, 364/426.02; 180/142, 79.1, 140; 280/91

[56] References Cited

U.S. PATENT DOCUMENTS

| | | | |
|---|---|---|---|
| 5,010,488 | 4/1991 | Ohshita et al. | 364/424.05 |
| 5,151,860 | 9/1992 | Taniguchi et al. | 364/424.05 |
| 5,251,135 | 10/1993 | Serizawa et al. | 364/424.05 |
| 5,267,160 | 11/1993 | Ito et al. | 364/424.05 |
| 5,343,393 | 8/1994 | Hirano et al. | 364/424.05 |
| 5,346,242 | 9/1994 | Karnopp | 280/707 |

*Primary Examiner*—Kevin J. Teska
*Assistant Examiner*—Susan Wieland
*Attorney, Agent, or Firm*—Browdy and Neimark

[57] ABSTRACT

A steering system for a road vehicle with front-wheel steering employs microprocessor integrating feedback of the vehicle yaw rate to the front-wheel steering actuator so as to decouple the yaw movement from the lateral movement of the front axle. Sensors measure vehicle speed, yaw rate (by gyroscope), lateral front axle acceleration (by acceleromether at the front axle), and the angle at which the driver holds the steering wheel. The microprocessor controls the front steering actuator according to a formula whose dependent quantities include the sensor outputs, fixed vehicle parameters (such as wheel base), and a preselected time constant. The vehicle's handling changes when the time constant is varied.

5 Claims, 1 Drawing Sheet

METHOD OF STEERING A ROAD VEHICLE WITH FRONT-WHEEL STEERING

BACKGROUND OF THE INVENTION

1. Field of the Invention

The invention relates to a method of steering a road vehicle with front-wheel steering, which has a wheel base 1 (in m), a front cornering stiffness $c_v$ (in N/rad), a center of gravity distance $l_h$ (in m) from the rear axle and a mass m (in kg), wherein by an integrating feedback of a yaw rate signal to the front-wheel steering the yaw movement is decoupled from the lateral movement of the front axle.

2. Description of the Prior Art

In a controlled steering the steering angle is not dictated solely by the driver via the steering wheel; on the contrary, steering movements are superimposed which arise from feedback of measured quantities of the steering dynamics. A requirement is therefore an active steering in which the steering angle is set by a (hydraulic or electric) motor. Active steering systems have already been tested in test vehicles (cf. for example W. Darenberg, Automatic tracking of motor vehicles, Automobilindustrie 1987, pages 155 to 159).

In active steering systems the steering motor is usually controlled by a microprocessor which in its steering control algorithm processes both sensor signals and the position of the steering wheel (which is measured for example with a potentiometer tap). A sensor already in production use in road vehicles is a vibration gyroscope for measuring the yaw rate (cf. H. Inoue, H. Harada and Y. Yokaya, All-wheel steering in the Toyota Soarer, Congress "All-wheel steering in automobiles" Haus der Technik, Essen, 3–4.12.1991).

The steering dynamics of road vehicles can be characterized by a transfer function from the steering wheel angle to the lateral acceleration of the front axle. Such a steering transfer function was substantially simplified by DE 40 28 320 in that the influence of the yaw movement on the steering dynamics was eliminated by a decoupling.

However, the remaining steering dynamics are still dependent on the travelling speed because in all known steering systems the transfer function from the steering wheel angle to the lateral acceleration of the front axle varies with the travelling speed. A learner driver must learn this change of the steering dynamics with the travelling speed and become accustomed thereto. An experienced driver is also liable to make erroneous assessments.

SUMMARY OF THE INVENTION

The object of the invention is therefore to provide a method of steering a road vehicle with front-wheel steering in which the steering transfer function is independent of the travelling speed.

The invention therefore proposes a method of steering a road vehicle with front-wheel steering, which has a wheel base 1 (in m), a front cornering stiffness $c_v$ (in N/rad), a center of gravity distance $l_h$ (in m) from the rear axle and a mass m (in kg), wherein by an integrating feedback of a yaw rate signal to the front-wheel steering the yaw movement is decoupled from the lateral movement of the front axle, wherein a predetermined time constant T of the steering transfer function is achieved by means of a gain factor $$k_p = \frac{ml_h}{c_v lT} \text{ (in s/m)}$$

via a command quantity $w_v$ of the decoupling control, the lateral acceleration $a_v$ (in m/s$^2$) at the front axle and the travelling speed v (in m/s) are measured, and $$w_v = k_p(a_{vsoll} - a_v) + \frac{1}{v} a_v \text{ (in 1/s)}$$

is calculated by means of a microprocessor, $a_{vsoll}$ being formed as command variable from a measured steering angle ($\delta_L$) by a prefilter.

According to the invention the solution is based on the feedback of the yaw rate measured with a gyroscope to the front-wheel steering according to DE 40 28 320 C2 of Applicants. According to the invention, in addition an accelerometer is used which measures the transverse acceleration of the front axle. Such acceleration meters have already been used in test vehicles (cf. for example B. Los, A. Matheis, J. E. Nametz and R. E. Smith, Design and development of a vehicle with microprocessor-controlled all-wheel steering, VDI Report No.650, Dusseldorf 1987, page 239 to 257). Consequently, the components required for implementing the invention belong to the prior art.

According to the control method of the invention, by a feedback of the transverse acceleration to the front-wheel steering complete independence of the steering transfer function from the travelling speed is achieved. In addition, by a coefficient adjustable in the controller the position of the pole of the steering transfer function can be fixed as desired. This makes steering easier for the driver and thus at the same time contributes to road safety.

BRIEF DESCRIPTION OF THE DRAWINGS

Hereinafter the invention will be explained with reference to a signal flow diagram illustrated in the Figure, in which the feedback of the yaw rate and the transverse acceleration of the axle are represented.

BRIEF DESCRIPTION OF THE DRAWING FIGURE

Figure 1:
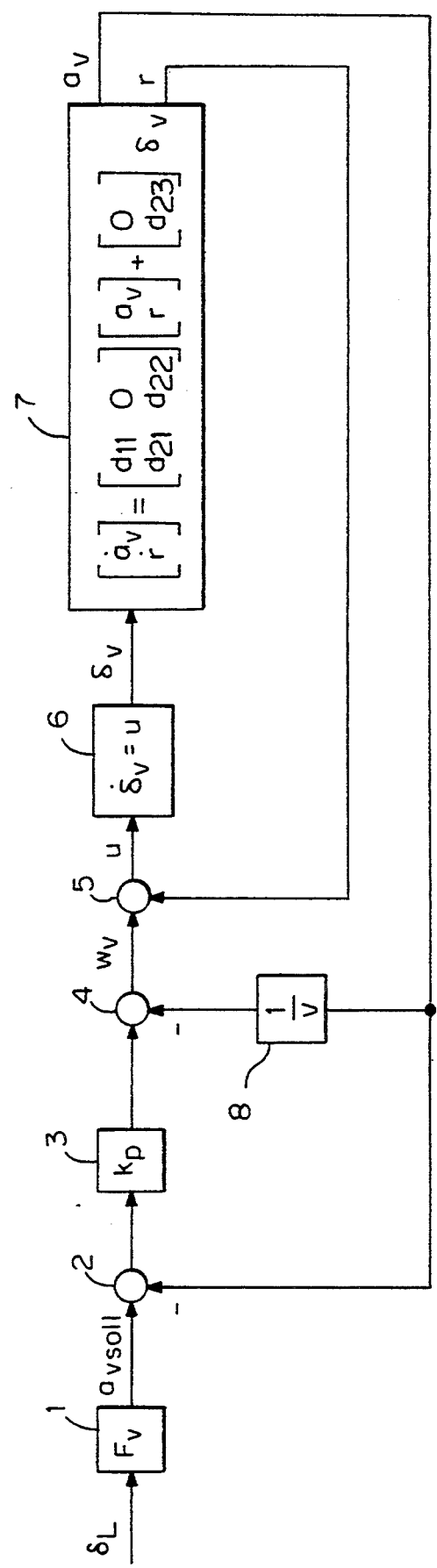

FIG. 1 is a schematic view of the present invention.

DESCRIPTION OF THE PREFERRED EMBODIMENT

Firstly, the theory underlying the method of the invention will be set forth. The computing operations of the controller here are performed in a microprocessor.

In DE 40 28 320 C2 the steering dynamics of a vehicle steered by the front wheels, including the steering motor, are represented by the following state (referred to in DE 40 28 320 as equation (21)):

$$\begin{bmatrix} a_v \\ r \\ \delta_v \end{bmatrix} = \begin{bmatrix} d_{11} & c & 0 \\ d_{21} & d_{22} & d_{23} \\ 0 & 0 & 0 \end{bmatrix} \begin{bmatrix} a_v \\ r \\ \delta_v \end{bmatrix} + \begin{bmatrix} c \\ 0 \\ 1 \end{bmatrix} u \quad (1)$$

In this equation, the state variables are
$a_v$ the transverse acceleration of the front axle,
r the yaw rate and
$\delta_v$ the steering angle of the front wheels.

The input quantity u is the input signal for the steering motor. The coefficients of the model are:

$c = c_v l / m l_h$
$d_{11} = -c/v$
$d_{21} = (c_h l_h - c_v l_v)/m l_v l_h$
$d_{22} = -c_h l / m v l_v$
$d_{23} = c_h / m l_v$ \hfill (2)

Herein:
$c_v(c_h)$ denotes the cornering stiffness at the front (rear)
$l_v(l_h)$ denotes the distance of the centre of gravity from the front (rear) axle
l denotes the wheel base ($l = l_v + l_h$)
m denotes the vehicle mass (standardised by the adhesion coefficient $\mu$) and
v denotes the travelling speed.
In DE 40 28 320 C2 a decoupling control law $$u = w_v - r \quad (3)$$

is introduced. (The reference input $w_v$ is denoted in DE 40 28 320 C2 as $r_{soll}$). Now, inserting equation (3) into equation (1) gives:

$$\begin{bmatrix} a_v \\ r \\ \delta_v \end{bmatrix} = \begin{bmatrix} d_{11} & 0 & 0 \\ d_{21} & d_{22} & d_{23} \\ 0 & -1 & 0 \end{bmatrix} \begin{bmatrix} a_v \\ r \\ \delta_v \end{bmatrix} + \begin{bmatrix} c \\ 0 \\ 1 \end{bmatrix} w_v \quad (4)$$

Due to the thus effected decoupling the model according to equation (4) breaks down into two submodels $$a_v = d_{11} a_v + c w_v \quad (5)$$

and $$\begin{bmatrix} r \\ \delta_v \end{bmatrix} = \begin{bmatrix} d_{22} & d_{23} \\ -1 & 0 \end{bmatrix} \begin{bmatrix} r \\ \delta_v \end{bmatrix} + \begin{bmatrix} d_{21} \\ 0 \end{bmatrix} a_v + \begin{bmatrix} 0 \\ 1 \end{bmatrix} w_v \quad (6)$$

The subsystem according to equation (6) which describes the yaw movement, is always stable. In this connection attention is drawn to patent application P 42 06 654.9 of Applicants (now issued as co-pending patent Application No. 08/338,175 now U.S. Pat. No. 5,375,057) of the present patent application, in which with the aid of an additional steering of the rear wheels and a quite specific feedback of the yaw rate to the rear-wheel steering the inherent values of the yaw movement are made independent of the speed and a desired damping can be predefined.

Hereinafter the subsystem according to equation (5) will be investigated, via which the driver effects the lateral guiding of the vehicle along a track. The transverse acceleration $a_v$ of the front axle and the travelling speed v are measured and via the control law $$w_v = k_p(a_{vsoll} - a_v) + \frac{1}{v} a_v \quad (7)$$

fed back to the command variable $w_v$ of the system according to equation (5). $a_{vsoll}$ is the command variable for the lateral acceleration $a_v$. It is for example formed directly by a potentiometer tap from the steering wheel or via a prefilter. The factor $k_p$ is a freely selectable gain factor.

Now, if equation (7) is inserted into equation (5) and the values of $d_{11}$ and c according to equation (2) are taken into account, this gives $$a_v = (-c/v - ck_p + c/v)a_v + ck_p a_{vsoll} \quad (8)$$

$$a_v = ck_p(a_{vsoll} - a_v), \quad c = c_v l / m l_h$$

The above differential equation (8) has thus become independent of the travelling speed. The associated transfer function links $a_v(s)$ and $a_{vsoll}(s)$ via the relationship $$a_v(s) = \frac{ck_p}{s + ck_p} a_{vsoll}(s) = \frac{1}{1 + \frac{m l_h}{c_v l k_p} s} a_{vsoll}(s) \quad (9)$$

Thus, with the signal $a_{vsoll}$ generated by the driver via the steering wheel the transverse acceleration of the front axle is effected via a low pass of the first order. The time constant of this low-pass filter is $$T = \frac{m l_h}{c_v l k_p} \quad (10)$$

A desired time constant T can be achieved by setting $$k_p = \frac{m l_h}{c_v l T}$$

so that for example a fast reaction of the steering can be ensured by selecting a small time constant T of the low-pass filter.

The cooperation of the two feedbacks according to equation (3) and equation (7) is illustrated by the signal flow diagram represented in FIG. 1.

In the signal flow diagram a measured steering wheel angle $\delta_L$ is applied to a prefilter 1. As already described above, the output signal $a_{vsoll}$ of the prefilter 1 is then the command variable for the lateral acceleration $a_v$ which is subtracted in an adder member 2. The time constant T of the steering transfer function is set in a unit 3 denoted by $k_p$. In a further adder member 4 following the unit 3 the reciprocal of the velocity v multiplied by the lateral acceleration $a_v$ is then added, i.e. $(1/v) \cdot a_v$, so that at the output of the adder member 4 the reference input $w_v$ according to equation (7) is present.

In a third adder member 5 the yaw rate r is then subtracted from the command variable $w_v$ so that at the output of the third adder member 5 the input quantity u required as input signal for a steering motor 6 is obtained. At the output of the integrating steering motor the quantity $\delta_v$ is then present which corresponds to the steering angle of the front wheels. The steering angle $\delta_v$ is linked via the differential equation of the steering dynamics 7, by which the real vehicle is described, to the lateral acceleration of the front axle $a_v$ and the yaw rate r.

The aforementioned output values of the block 7, steering dynamics, in the form of the yaw rate r (measured with a gyroscope) and the transverse acceleration of the front axle $a_v$ measured with an accelerometer) are applied in the manner apparent from FIG. 1 to the adder members 1 and 3 respectively.

What is claimed is:

1. A road vehicle system, steerable by a driver, having:
- steerable front wheels disposed proximal a front axle, the front wheels rotatable to a front steering angle $\delta_v$;
- rear wheels disposed a wheel base L (in m) behind the front wheels;
- a front cornering stiffness $c_v$ (in N/rad);
- a mass m (in kg);
- a center of mass located a distance $l_h$ (in m) from the rear axle; and
- a steering wheel rotatable by the driver to a steering wheel angle;
- a steering system comprising:
- a steering wheel angle sensor generating a steering wheel angle signal $\delta_L$ (in rad);
- a speedometer sensor generating a velocity signal v (in m/s);
- a gyroscopic yaw sensor generating a yaw signal r proportional to a yawing angular rotation rate of the vehicle (in rad/s);
- an accelerometer sensor generating a signal $a_v$ (in m/s$^2$) proportional to a lateral transverse acceleration of the front axle;
- an actuator to control the front steering angle $\delta_v$ according to an actuator input signal u;
- adjustment means for generating a process command variable $a_{vsoll}$ from the steering wheel angle signal $\delta_L$;
- a microprocessor for accepting the r, the v, the $a_v$, and $a_{vsoll}$, and a gain factor $k_p$, and generating therefrom the u;

the microprocessor further comprising means for performing
a first process for calculating a reference input $$w_v = k_p(a_{vsoll} - a_v) + a_v/v \ (in \ s^{-1}),$$

a second process for calculating the actuator input signal $$u = w_v - r,$$

and means for outputting the u to the actuator so as to control the front steering angle $\delta_v$;
wherein, by an integrating feedback of the yaw signal r, yaw movement is decoupled from lateral movements of the front axle and front-wheel steering is independent of vehicle speed.

2. The steering system according to claim 1 further including means for the driver of the road vehicle to vary the time constant T.

3. The steering system according to claim 1, wherein the adjustment means for generating a process command variable $a_{vsoll}$ from the steering wheel angle signal $\delta_L$ further includes a steering wheel potentiometer tap.

4. The steering system according to claim 1 wherein the adjustment means for generating a process command variable $a_{soll}$ from the steering wheel angle signal $\delta_L$ further includes a prefilter.

5. The steering system according to claim 1, further including means for calculating the gain factor $k_p$ from a preselected time constant T according to a formula $$k_p = (ml_h)/(c_v L T) \ (in \ s/m).$$

* * * * *